(12) United States Patent
Pittman

(10) Patent No.: US 7,249,227 B1
(45) Date of Patent: Jul. 24, 2007

(54) SYSTEM AND METHOD FOR ZERO COPY BLOCK PROTOCOL WRITE OPERATIONS

(75) Inventor: Joseph C. Pittman, Apex, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 568 days.

(21) Appl. No.: 10/747,571

(22) Filed: Dec. 29, 2003

(51) Int. Cl.
*G06F 12/00* (2006.01)
(52) U.S. Cl. .................................... 711/154
(58) Field of Classification Search ............... 711/162
See application file for complete search history.

(56) References Cited

U.S. PATENT DOCUMENTS

| | | | | |
|---|---|---|---|---|
| 5,920,703 | A | * | 7/1999 | Campbell et al. ........... 709/236 |
| 5,983,259 | A | * | 11/1999 | Campbell et al. ........... 709/200 |
| 6,651,117 | B1 | * | 11/2003 | Wilson et al. ................ 710/33 |
| 6,760,304 | B2 | | 7/2004 | Uzrad-Nali et al. |
| 6,941,391 | B2 | * | 9/2005 | Kasper ........................ 710/22 |
| 2003/0115350 | A1 | | 6/2003 | Uzrad-Nali et al. |
| 2003/0217119 | A1 | * | 11/2003 | Raman et al. ............... 709/219 |
| 2004/0064815 | A1 | | 4/2004 | Uzrad-Nali et al. |
| 2004/0156393 | A1 | | 8/2004 | Gupta et al. |
| 2004/0268017 | A1 | | 12/2004 | Uzrad-Nali et al. |
| 2005/0135352 | A1 | * | 6/2005 | Roe et al. .................. 370/389 |

OTHER PUBLICATIONS

Maintenance Procedures ND (8C) nd-network disk control Feb. 1985.
Misc. Reference Manual Pages ND (4P) nd-network disk driver Jul. 26, 1985.
Asante EN/SC Adapter Family Installation Guide May 1994.
Asante Desktop EN/SC Adapters User's Manual Apr. 1996.
Performance Without Compromise: The Virtual Storage Architecture 1997.
Anthony J. McGregor Department of Computer Science, University of Waikato Dissertation: Block-Based Distributed File Systems Jul. 1997.

* cited by examiner

*Primary Examiner*—Hiep T. Nguyen
(74) *Attorney, Agent, or Firm*—Cesari & McKenna, LLP

(57) ABSTRACT

A system and method for zero copy block protocol write operations obviates the need to copy the contents of memory buffers (mbufs) at a storage system. A storage operating system of the storage system receives data from a network and stores the data in chains of mbufs having various lengths. An iSCSI driver processes (interprets) the received mbufs and passes the appropriate data and interpreted command to a SCSI target module of the storage operating system. The SCSI target module utilizes the mbufs and the data contained therein to perform appropriate write operations in response to write requests received from clients.

22 Claims, 7 Drawing Sheets

SYSTEM AND METHOD FOR ZERO COPY BLOCK PROTOCOL WRITE OPERATIONS

RELATED APPLICATIONS

This application is related to the following United States Patent Applications:

Ser. No. 10/271,633, entitled ZERO COPY RIGHTS THROUGH USE OF MBUFS, by Douglas J. Santry, et al.; and Ser. No. 10/632,203, entitled MANAGING OWNERSHIP OF MEMORY BUFFERS (MBUFS), by Nitin Muppalaneni, et al.

FIELD OF INVENTION

The present invention relates to storage systems and, more specifically, to a technique for performing zero copy write operations using block protocols.

BACKGROUND INFORMATION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or storage appliance, may be further configured to operate according to a client/server model of information delivery to thereby allow many client systems (clients) to access shared resources, such as files, stored on the storage appliance. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the storage appliance. The clients typically communicate with the storage appliance by exchanging discrete frames or packets of data according to pre-defined protocols, such as the Transmission Control Protocol/Internet Protocol (TCP/IP).

In the client/server model, the client may comprise an application executing on a computer that "connects" to the storage appliance over a computer network, such as a point-to-point link, shared local area network, wide area network or virtual private network implemented over a public network, such as the Internet. NAS systems generally utilize file-based access protocols; therefore, each client may request the services of the storage appliance by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the storage appliance may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

SCSI is a peripheral input/output (I/O) interface with a standard, device independent protocol that allows different peripheral storage devices, such as disks, to attach to the storage system. In SCSI terminology, clients operating in a SAN environment are initiators that initiate requests and commands for data. The storage system is a target configured to respond to the requests issued by the initiators in accordance with a request/response protocol. The SAN clients typically identify and address the stored information in the form of blocks or disks by logical unit numbers ("luns").

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a lun.

Packets of information received by a storage appliance from a network interface are typically stored in a memory buffer data structure or mbuf in the memory of the storage appliance. Mbufs are used to organize received information into a standardized format that can be manipulated by various layers of a network protocol stack within a storage operating system. The information stored in a mbuf can include a variety of different data types including, inter alia, source and destination addresses, socket options, user data and file access requests. Further, mbufs can be used as elements of larger data structures, e.g. linked lists, and are particularly useful in dynamically changing structures since they can be created or removed "on-the-fly." A description of mbuf data structures is provided in *TCP/IP Illustrated, Volume 2* by Wright, et al (1995) which is incorporated herein by reference.

Information is often received from a network as data packets of various lengths and these packets are stored in variable length chains of mbufs. In contrast, block-based protocols usually operate on predefined block sizes. Thus, received data is typically converted from variable length mbufs to appropriate fixed size blocks for use by the block-based protocols.

The process of converting data from variable length mbuf data structures to fixed sized blocks consumes system resources, such as memory and central processing unit (CPU) cycles, that could be used for other operations executed by the storage appliance. Furthermore, the latency resulting from this conversion becomes particularly noticeable when a large number of mbuf data structures are converted to fixed sized data blocks. For example, when the storage appliance receives a request to store (via a "WRITE" operation) a large amount of data to disk, the storage appliance must allocate a sufficient amount of memory for mbufs to receive the incoming data and, in addition, must allocate more memory to copy the contents of the mbufs when the received data is divided into fixed block sizes. Not only does such a WRITE operation consume a lot of memory, but it also requires the storage appliance's CPU to implement instructions for partitioning the data, thereby consuming CPU bandwidth that could be used by other processes.

Therefore, it is generally desirable to decrease the latency of processing incoming data to a storage appliance by decreasing the number of times mbufs are copied and partitioned in the storage appliance's memory. More specifically, it is desirable to minimize the amount of time and system resources needed to write large amounts of data to one or more storage disks in a storage appliance without affecting the resolution of other data access requests, such as iSCSI "READ" requests.

SUMMARY OF THE INVENTION

The present invention overcomes the disadvantages of the prior art by providing a system and method for processing write requests issued by clients to a storage system without copying contents of network memory buffers (mbufs), into which data associated with the write requests are initially deposited to other in-memory data containers such as file system buffers. The storage system is illustratively a storage appliance configured to directly handle data, e.g., SCSI command data blocks (CDBs) deposited in the mbufs, in a manner that does not consume time and system resources copying these mbuf contents as the write requests are processed. An iSCSI driver of a storage operating system executing on the storage appliance receives mbufs containing SCSI CDBs from TCP/IP layer of the operating system. The iSCSI driver processes the received SCSI CDBs and passes appropriate pointers referring these mbufs to a SCSI target module, of a virtualization system implemented by the storage operating system. The SCSI target module then cooperates with a file system within the virtualization system to either free the received mbufs or utilize them as a backing store when writing the received data to appropriate storage devices.

By passing the appropriate mbuf pointers to the SCSI target module, the iSCSI driver obviates the need to copy the received data into additional fixed-length file system buffers to be processed by higher layers of the storage operating system. However, by eliminating these additional copies of the buffers, system performance is increased by reducing the load on the processor(s) executing the storage operating system.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A. Storage Appliance

The present invention is directed to a technique for processing write requests received at a storage appliance without copying data from network buffers (mbufs) where the data is initially deposited upon receipt by a network interface controller (NIC) of the appliance. As used herein, the term storage appliance denotes a computer having features such as simplicity of storage service management and ease of storage reconfiguration, including reusable storage space, for users (system administrators) and clients of network attached storage (NAS) and storage area network (SAN) deployments. The storage appliance may provide NAS services through a file system, while the same appliance provides SAN services through SAN virtualization, including logical unit number (lun) emulation.

Figure 1:
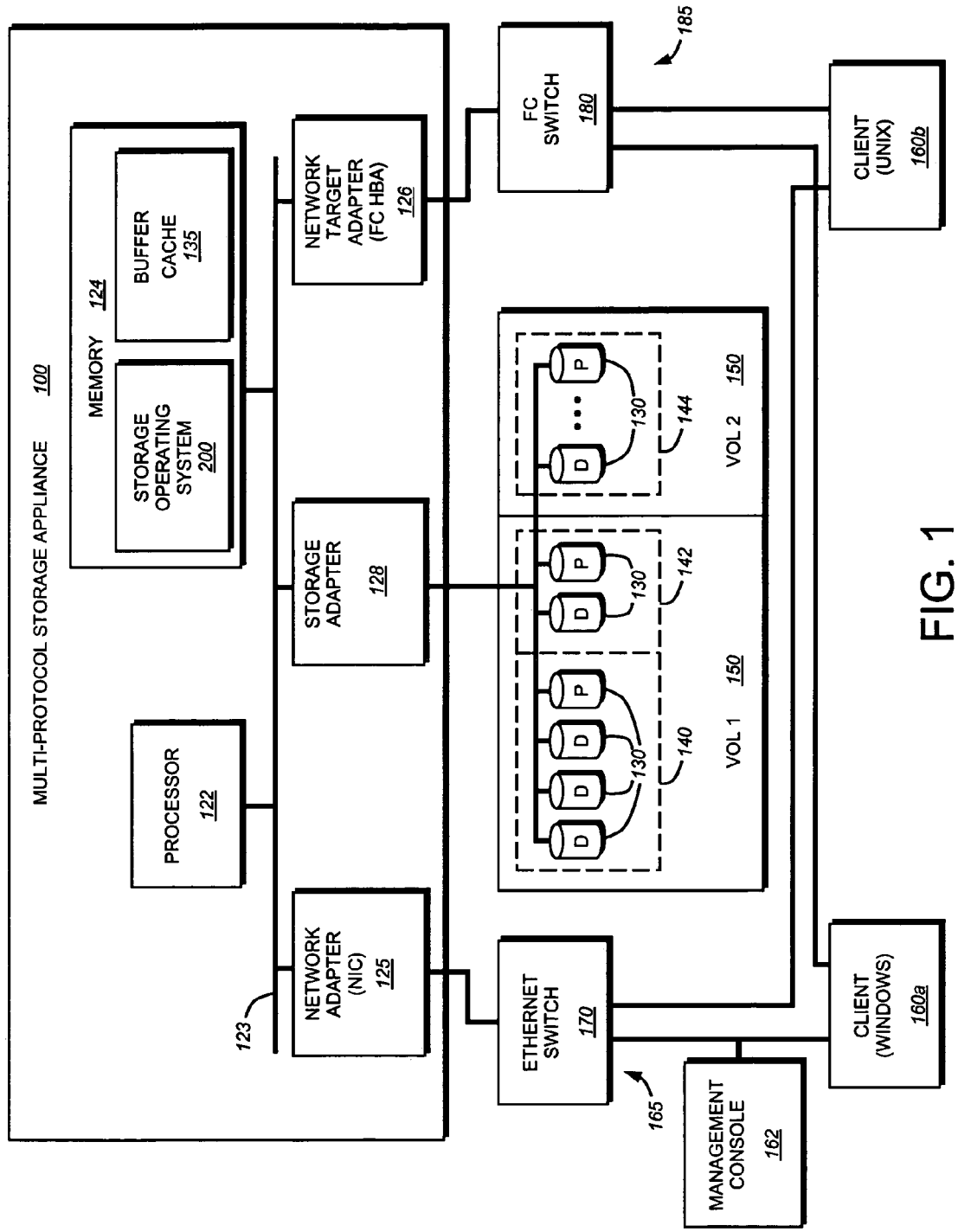
FIG. 1 is a schematic block diagram of an exemplary storage appliance in accordance with an embodiment of the present invention.

FIG. 1 is a schematic block diagram of an exemplary storage appliance 100 configured to provide storage service relating to the organization of information on storage devices, such as disks 130. The storage appliance 100 is illustratively embodied as a storage system comprising a processor 122, a memory 124, a plurality of network adapters 125, 126 and a storage adapter 128 interconnected by a system bus 123. The storage appliance 100 also includes a storage operating system 200 that provides a virtualization system (and, in particular, a file system) to logically organize the information as a hierarchical structure of named directory, file and virtual disk (vdisk) storage objects on the disks 130.

Whereas clients of a NAS-based network environment have a storage viewpoint of files, the clients of a SAN-based network environment have a storage viewpoint of blocks or disks. To that end, the multi-protocol storage appliance 100 presents (exports) disks to SAN clients through the creation of luns or vdisk objects. A vdisk object (hereinafter "vdisk") is a special file type that is implemented by the virtualization system and translated into an emulated disk as viewed by the SAN clients. The storage appliance thereafter makes these emulated disks accessible to the SAN clients through controlled exports, as described further herein.

In the illustrative embodiment, the memory 124 comprises storage locations that are addressable by the processor and adapters for storing software program code and data structures associated with the present invention. A portion of the memory 124 is organized as a buffer cache 135 for storing received data in, for example, mbufs. The processor and adapters may, in turn, comprise processing elements and/or logic circuitry configured to execute the software code and manipulate the data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapter 125 couples the storage appliance to a plurality of clients 160*a,b* over point-to-point links, wide area networks, virtual private networks implemented over a public network (Internet) or a shared local area network, hereinafter referred to as an illustrative Ethernet network 165. Therefore, the network adapter 125 may comprise a network interface card (NIC) having the mechanical, electrical and signaling circuitry needed to connect the appliance to a network switch, such as a conventional Ethernet switch 170. In alternate embodiments, the network adapter 125 may comprise a TCP/IP Offload Engine (TOE) or other hardware-assisted TCP/IP interface. For this NAS-based network environment, the clients are configured to access information stored on the storage appliance as files. However, clients may access vdisks stored on the storage appliance by utilizing a block-based protocol encapsulated in TCP/IP, such as iSCSI (SCSI encapsulated in TCP/IP). The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over an NAS-based network. Therefore, each client 160 may request the services of the storage appliance 100 by issuing file access protocol messages (in the form of packets) to the appliance over the network 165. For example, a client 160*a* running the Windows operating system may communicate with the storage appliance 100 using the Common Internet File System (CIFS) protocol over TCP/IP. On the other hand, a client 160*b* running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload FC network processing operations for the storage appliance.

The clients 160 generally utilize block-based access protocols, such as the Small Computer Systems Interface (SCSI) protocol, when accessing information (in the form of blocks, disks or vdisks) as luns over a SAN-based network. SCSI is a peripheral input/output (I/O) interface with a standard, device independent protocol that allows different peripheral devices to attach and provide storage services to a storage consumer, or client. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN), e.g., a world wide node name (WWNN) or a world wide port name(WWPN) consisting of, illustratively, a 64-bit number.

The multi-protocol storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 165, 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

In SCSI addressing, each initiator has a WWN or iSCSI name that is used by the initiator to access a lun entity, such as a disk, on the storage appliance. For example, the storage appliance on a FC SAN has a WWN, which is a 64-bit location independent identifier that is typically written in hexadecimal notation. iSCSI names are analogous to WWNs, but with a different format. iSCSI names are used with the iSCSI protocol as IDs when restricting block-level access to a lun by one or more initiators. Thus, each time an initiator desires access to a lun, the WWN ID or iSCSI name must be provided to the storage appliance by a client/user or the initiator.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In one embodiment, a minimum of one parity disk and one data disk may be employed. However, a typical implementation may include three data and one parity disk per RAID group and at least one RAID group per volume.

B. Storage Operating System

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any file system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, available from Network Appliance, Inc, of Sunnyvale, Calif., which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
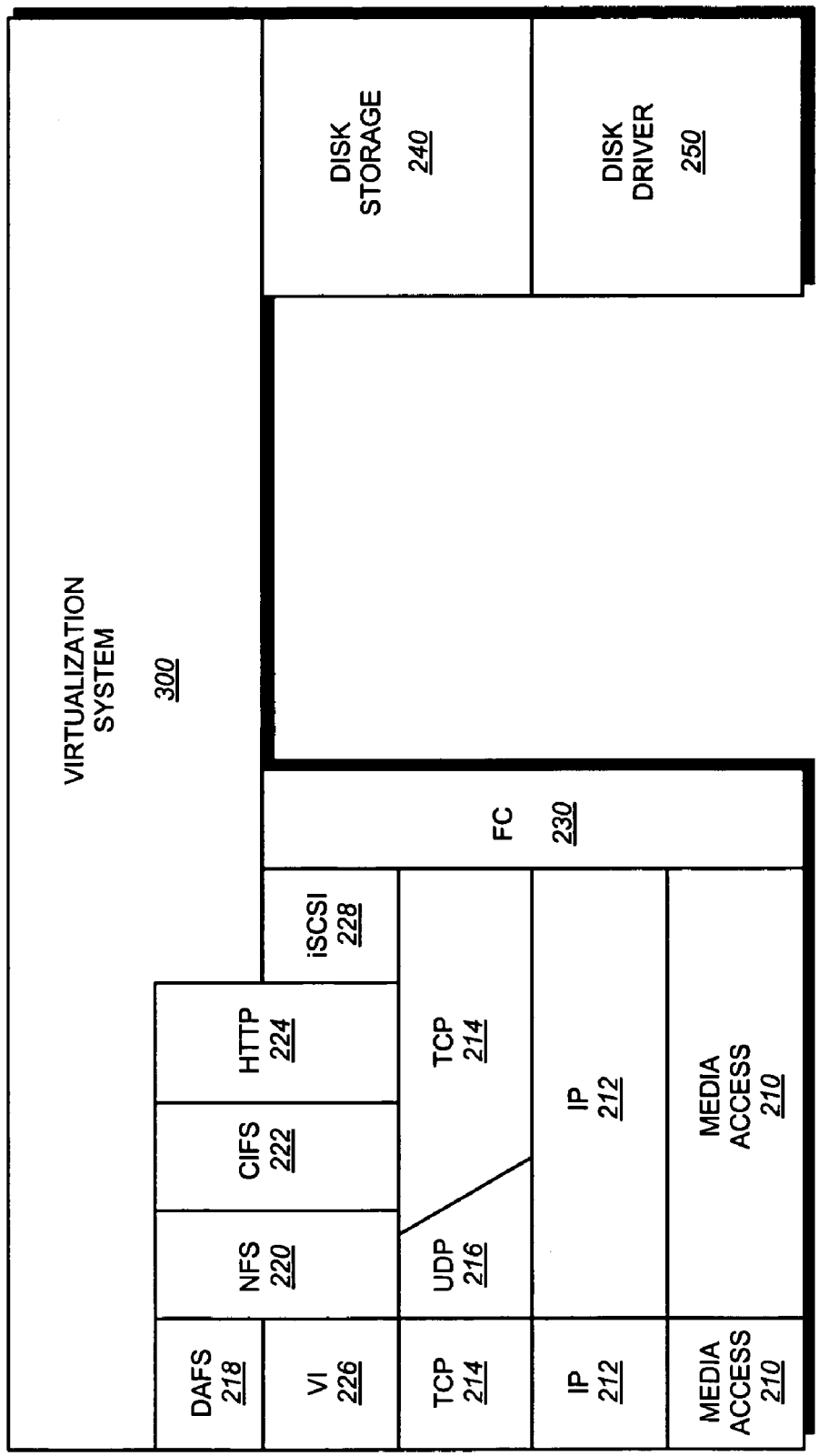
FIG. 2 is a schematic block diagram of an exemplary storage operating system in accordance with an embodiment of the present invention.

FIG. 2 is a schematic block diagram of a storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols.

The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Figure 3:
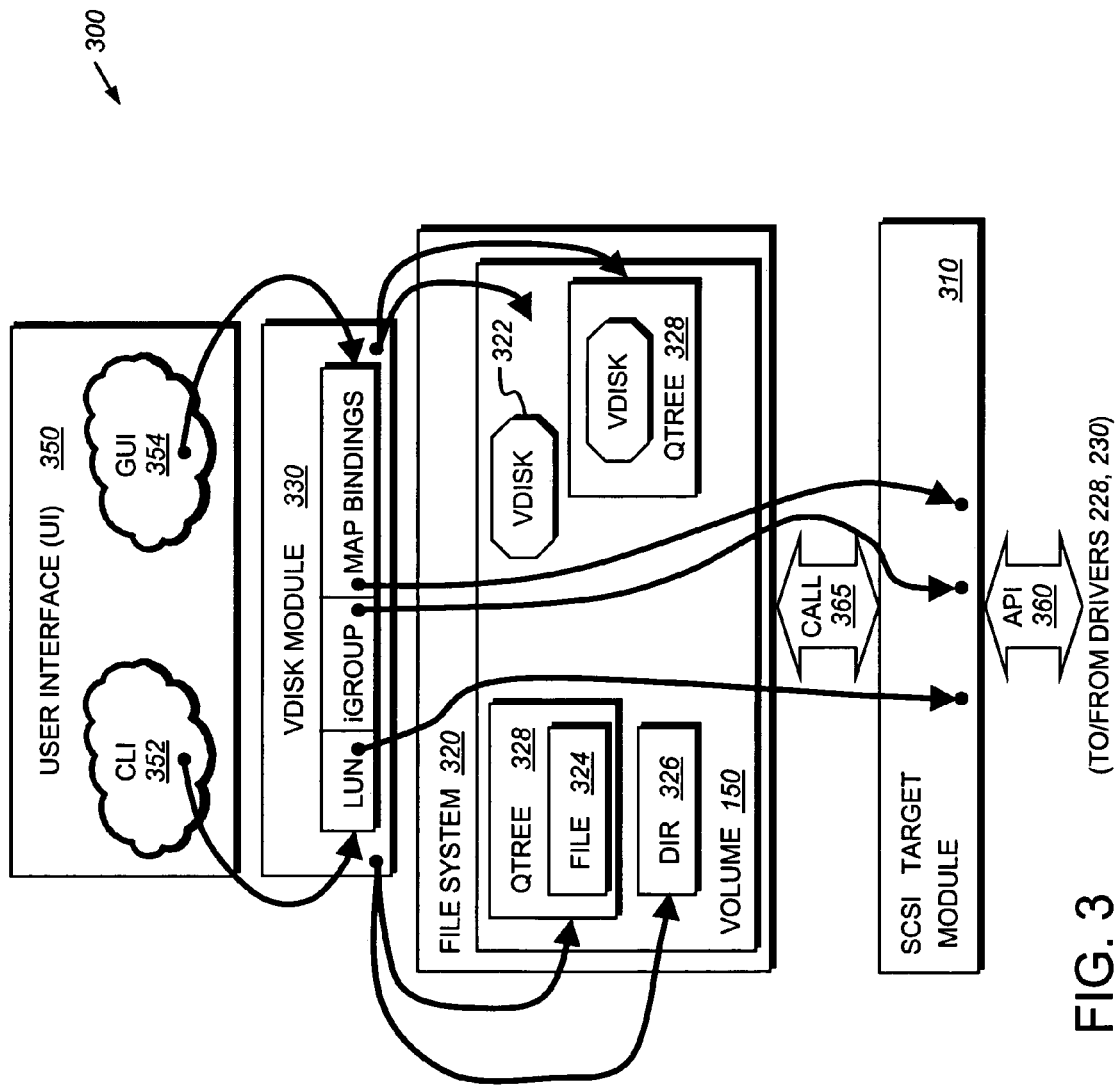
FIG. 3 is a schematic block diagram of an exemplary virtualization system utilized by a storage operating system in accordance with an embodiment of the present invention.

Bridging the disk software layers with the integrated network protocol stack layers is a virtualization system 300. FIG. 3 is a schematic block diagram of the virtualization system 300 that is implemented by a file system 320 cooperating with virtualization modules illustratively embodied as, e.g., vdisk module 330 and SCSI target module 310. It should be noted that the vdisk module 330, file system 320 and SCSI target module 310 can be implemented in software, hardware, firmware, or a combination thereof. The vdisk module 330 is layered on (and interacts with) the file system 320 to provide a data path from the block-based SCSI target module to blocks managed by the file system. The vdisk module also enables access by administrative interfaces, such as a user interface (UI 350). In essence, the vdisk module 330 manages SAN deployments by, among other things, implementing a comprehensive set of vdisk (lun) commands issued through a management console 162 that may also be interconnected with the storage appliance. The UI 350 and management console 162 cooperate to provide a user interface system having a command line interface (CLI) and/or a graphical user interface (GUI) for storage system management. The vdisk commands are converted to primitive file system operations ("primitives") that interact with the file system 320 and the SCSI target module 310 to implement the vdisks.

The SCSI target module 310, in turn, initiates emulation of a disk or lun by providing a mapping procedure that translates logical block access to luns specified in access requests into virtual block access to the special vdisk file types and, for responses to the requests, vdisks into luns. The SCSI target module is illustratively disposed between the FC and iSCSI drivers 228, 230 and the file system 320 to thereby provide a translation layer of the virtualization system 300 between the SAN block (lun) space and the file system space, where luns are represented as vdisks. By "disposing" SAN virtualization over the file system 320, the multi-protocol storage appliance reverses the approaches taken by prior systems to thereby provide a single unified storage platform for essentially all storage access protocols.

The file system provides capabilities for use in file-based access to information stored on the storage devices, such as disks. In addition, the file system provides volume management capabilities for use in block-based access to the stored information. That is, in addition to providing file system semantics (such as differentiation of storage into discrete objects and naming of those storage objects), the file system 320 provides functions normally associated with a volume manager including (i) aggregation of the disks, (ii) aggregation of storage bandwidth of the disks, and (iii) reliability guarantees, such as mirroring and/or parity (RAID), to thereby present one or more storage objects layered on the file system. A feature of the multi-protocol storage appliance (and the novel user interface) is the simplicity of use associated with these volume management capabilities, particularly when used in SAN deployments.

The file system 320 illustratively implements the WAFL file system having an on-disk format representation that is block-based using, e.g., 4 kilobyte (kB) blocks and using inodes to describe the files. The WAFL file system uses files to store meta-data describing the layout of its file system; these meta-data files include, among others, an inode file. A file handle, i.e., an identifier that includes an inode number, is used to retrieve an inode from disk. A description of the structure of the file system, including the inode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued Oct. 6, 1998, which is hereby incorporated by reference as though fully set forth herein.

The file system implements access operations to vdisks 322, as well as to files 324 and directories (dir 326) that coexist with respect to global space management of units of storage, such as volumes 150 and/or qtrees 328. A qtree 328 is a special directory that has the properties of a logical sub-volume within the namespace of a physical volume. Each file system storage object (file, directory or vdisk) is illustratively associated with one qtree, and quotas, security properties and other items can be assigned on a per-qtree basis. The vdisks and files/directories may be layered on top of qtrees 328 that, is in turn, are layered on top of volumes 150 as abstracted by the file system "virtualization" layer 320.

Note that the vdisk storage objects in the file system 320 are generally associated with SAN deployments of the storage appliance, whereas the file and directory storage objects are associated with NAS deployments of the appliance. The files and directories are generally not accessible via the FC or SCSI block access protocols; however, a file can be converted to a vdisk and then accessed by either the SAN or NAS protocol. The vdisks are thus accessible as luns from the SAN (FC and SCSI) protocols and as files by the NAS (NFS and CIFS) protocols.

The vdisk module 330 supports attributes and persistent lun map bindings that assign numbers to a created vdisk. These lun map bindings are thereafter used to export vdisks as certain SCSI identifiers (IDs) to the clients. In particular, the created vdisk can be exported via a lun mapping technique to enable a SAN client to "view" (access) a disk. Vdisks (luns) generally require strict controlled access in a SAN environment; sharing of luns in a SAN environment typically occurs only in limited circumstances, such as clustered file systems, clustered operating systems and multi-pathing configurations. A system administrator of the multi-protocol storage appliance determines which vdisks (luns) can be exported to a SAN client. Once a vdisk is exported as a lun, the client may access the vdisk over the SAN network utilizing a block access protocol, such as FCP and iSCSI.

D. Memory Buffers

Referring again to FIG. 1, when a packet of data is received by storage appliance 100 at the network adapter 125, the data is transferred to memory 124. More specifically, storage operating system 200 allocates an area in the storage appliance's buffer cache 135 or other suitable computer-readable medium, to store the received data in a data structure called a memory buffer or mbuf.

Figure 4:
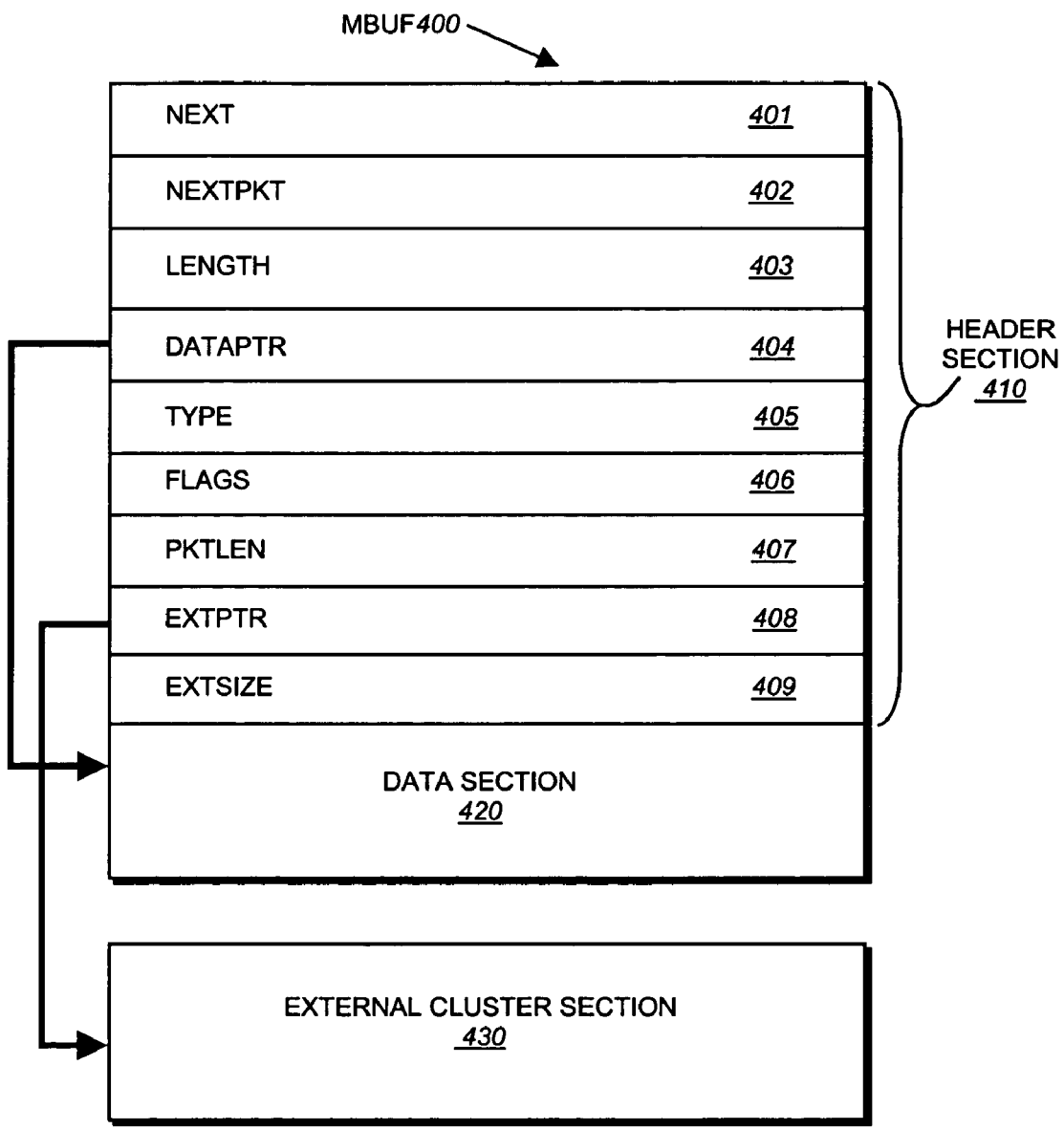
FIG. 4 is a schematic block diagram of an exemplary mbuf or memory buffer data structure in accordance with an embodiment of the present invention.

In general, mbufs are used to organize received information in a standardized format that can be passed among the different layers of a storage operating system. However, not every storage operating system uses the same mbuf structure. FIG. 4 illustrates a schematic block diagram of one exemplary mbuf, although other variations are expressly contemplated. For instance, in exemplary mbuf 400, fields could be added or removed from header section 410 or the relative size of header section 410, data section 420 and/or external cluster section 430 may be varied depending on the resources available to the operating system. Therefore, the mbuf depicted in FIG. 4 is used herein only for explanatory purposes, and the present invention is not limited to its exemplary structure.

FIG. 4 illustrates an exemplary mbuf 400 comprising a header section 410 and a data section 420 typically having a fixed combined length, e.g. 128 bytes. Header section 410 comprises a plurality of fields used to describe the contents of the mbuf which may include data (such as a packet) stored in data section 420. The fields in a mbuf can be tailored to specific applications, although one representative set of fields 401-409 is included in mbuf 400. The NEXT field 401 and NEXTPKT field 402 contain pointers to other data structures, such as another mbuf. When data is received in packets, the NEXT pointer usually links mbufs storing data from the same received packet, whereas the NEXTPKT pointer usually links different data packets associated with the same overall data transmission. When data is stored in mbuf 400, the DATAPTR field 404 comprises a pointer to locate the data and LENGTH field 403 keeps track of the amount of data stored. The TYPE field 405 can indicate the type of data stored in the mbuf, e.g. packet header data and/or user data, and the FLAGS field 406 is used to indicate anomalies and special attributes, e.g., the presence of an external cluster section or packet header, associated with the mbuf. When a received data packet spans multiple mbufs, the PKTLEN field 407 can be used to store the overall packet length.

When the data in a received packet is too large to fit in data section 320, the mbuf may use an external cluster section 430 to extend its available storage. The EXTPTR field 408 can store a pointer that references an external cluster and the size of the cluster can be stored in EXTSIZE field 409. Usually, external clusters are a fixed sized, e.g. 1 kilobyte or 2 kilobytes, although EXTPTR could point to clusters of any arbitrary size. Because an external cluster extends the data section of a mbuf, DATAPTR field 404 may point directly to data in the external cluster section 430 instead of data in data section 420. Furthermore, an external cluster may be used by more than one mbuf, so DATAPTR pointers from a plurality of mbufs could point to different data within the same external cluster.

Figure 5:
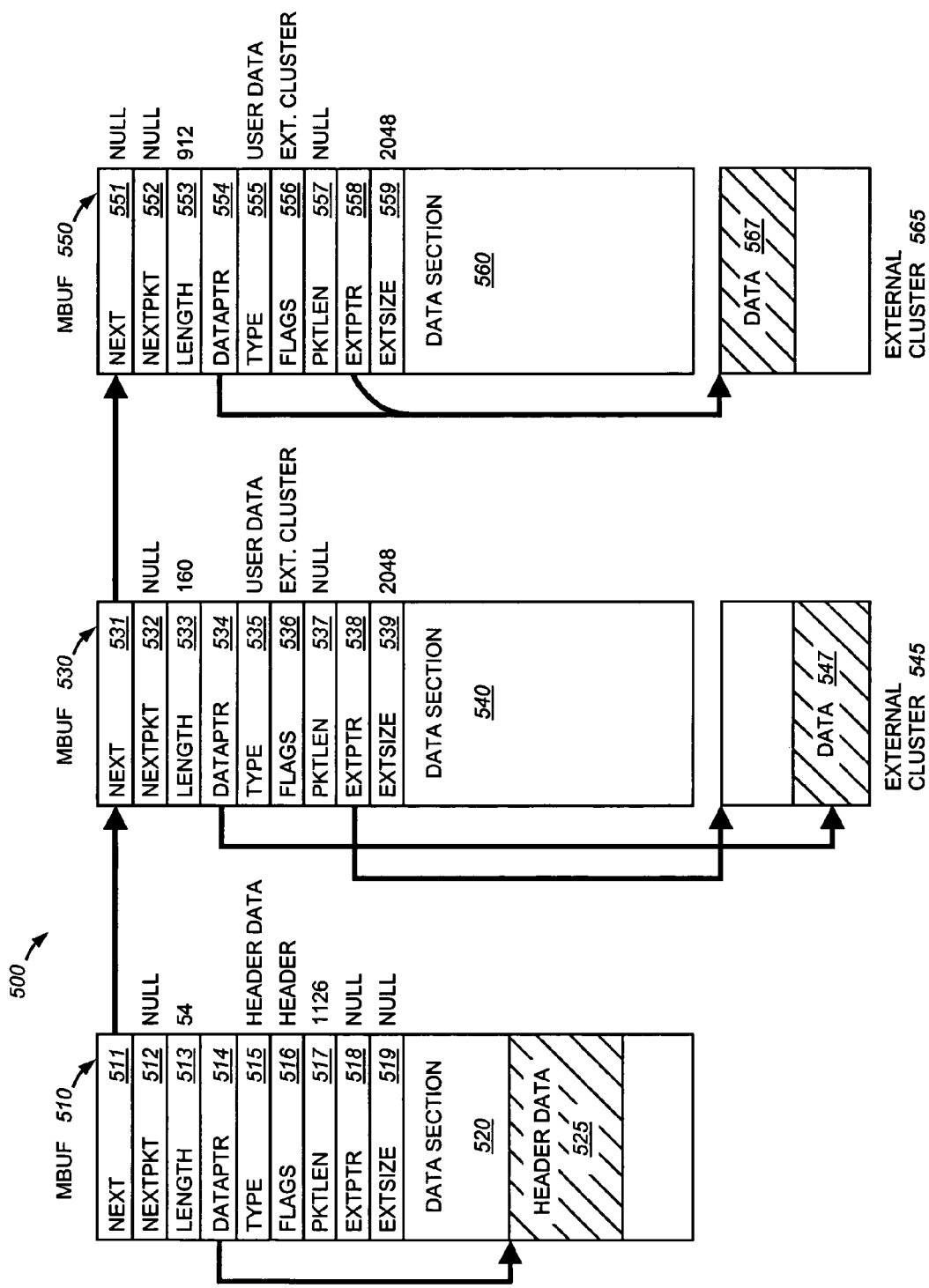
FIG. 5 is a schematic block diagram of an exemplary linked list of memory buffer data structures in accordance with an embodiment of the present invention.

Although FIG. 4 details the structure of one exemplary mbuf, multiple mbufs are typically linked together to form chains of mbufs. That is, a data packet received from a network, such as a conventional iSCSI protocol data unit (PDU), generally will not fit in a single mbuf and instead is stored in a linked list of mbufs. FIG. 5 illustrates an example of a packet of information 500 ("mbuf chain" 500) stored as a linked list of mbufs 510, 530 and 550. It will be understood to those skilled in the art that the chain of mbufs in FIG. 5 is representative only and any other combination of mbuf types and sizes could also be used to construct a mbuf chain. In FIG. 5, mbuf 510 stores a 54 byte packet header and mbufs 530 and 550 store 160 bytes and 912 bytes of user data respectively. Therefore, the total length of header and user data in the illustrated packet is 1126 bytes.

To form the linked list of mbufs 500, the NEXT fields 511 and 531 point to adjacent mbufs, although NEXT field 551 is set to NULL since it resides in the last mbuf of the chain. The NEXTPKT fields 512, 532 and 554 are all set to NULL since there is only a single data packet. The amount of data in each respective mbuf is stored by LENGTH fields 513, 533 and 553 and the DATAPTR fields 514, 534 and 554 locate their stored data. The PKTLEN field 517 in "leading" mbuf 510 stores the overall length of data packet 500 and subsequent PKTLEN fields 537 and 557 are set to NULL, although each mbuf in the chain could store the overall packet length. The TYPE field 515 and FLAGS field 516 indicate the data in mbuf 510 is header data whereas the TYPE fields 535 and 555 indicate mbufs 530 and 550 store user data.

Packet header data 525 is small enough to fit in data section 520, however user data 547 and 567 are too large to fit in their respective data sections 540 and 560 and require use of external clusters 545 and 565. FLAGS fields 536 and 556 indicate external clusters are being used, and EXTPTR fields 538 and 558 point to the beginning of each external cluster. Each external cluster in FIG. 4 can store up to 2048 bytes as indicated in EXTSIZE fields 539 and 559. In contrast, leading mbuf 510 does not use an external cluster and consequently sets its EXTPTR field 518 and EXTSIZE field 519 to NULL.

Figure 6:
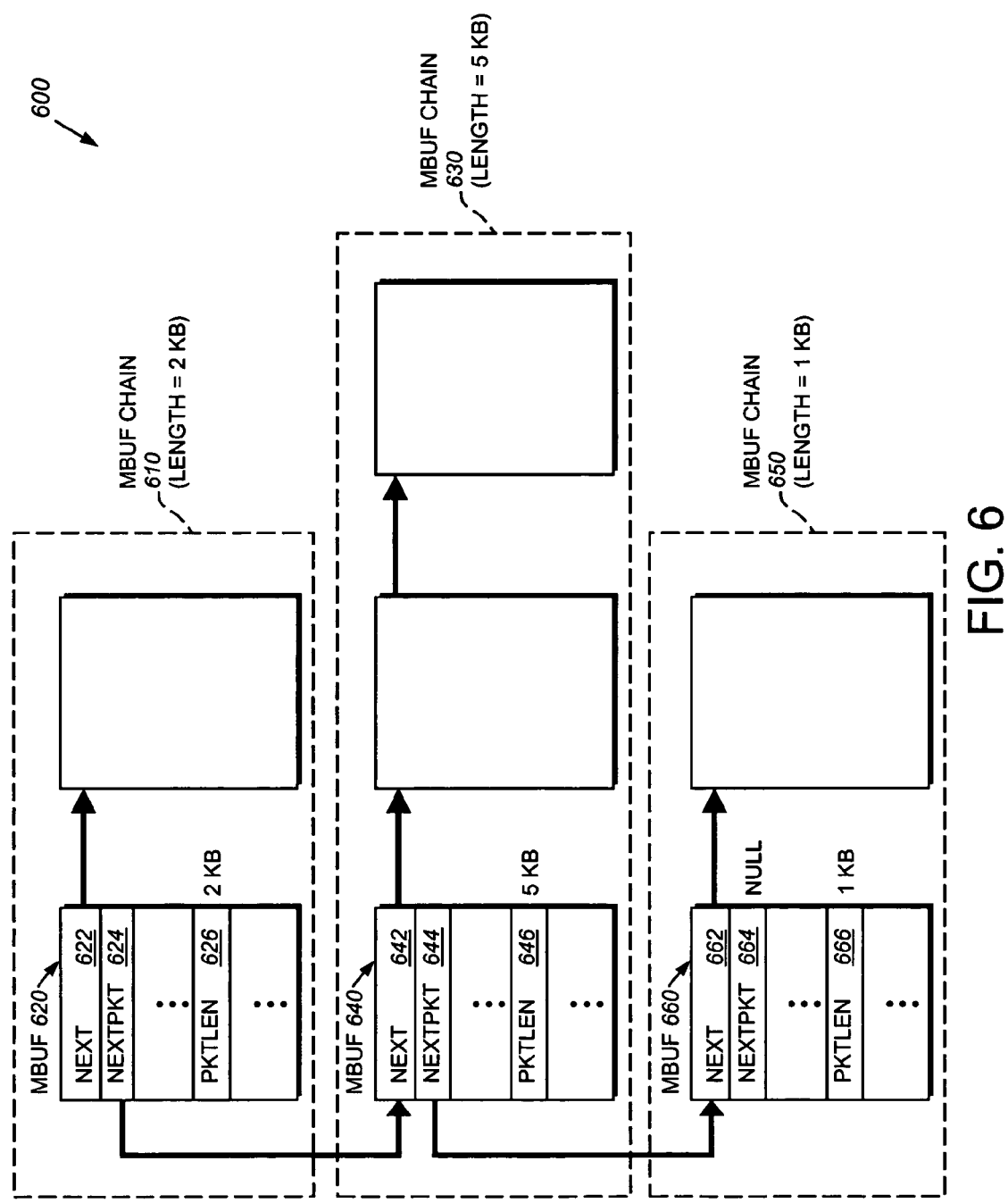
FIG. 6 is a schematic block diagram of an exemplary linked list of linked lists of memory buffer data structures in accordance with an embodiment of the present invention.

Broadly stated, information is usually received by a storage appliance as a plurality of data packets that may be of varying sizes. The storage appliance's storage operating system receives each packet and stores it in a chain of mbufs as shown in FIG. 5. Thus, an overall data transmission typically comprises an ordered sequence of mbuf chains as shown in FIG. 6 where data transmission 600 comprises mbuf chains 610, 630 and 650. Here, a storage appliance receives three data packets having lengths 2 KB, 5 KB and 1 KB and stores them in respective mbuf chains 610, 630 and 650. Although only three received data packets are depicted, it will be understood to those skilled in the art that the data transmission could be composed of any arbitrary number of received data packets of varying lengths. The NEXT fields 622, 642 and 662 point to adjacent memory buffers in their respective mbuf chains and the PKTLEN fields 626, 646 and 666 in leading mbufs 620, 640 and 660 store the amount of data in each mbuf chain. The NEXTPKT fields 624 and 644 link adjacent mbuf chains and NEXTPKT field 664 is set to NULL since it is stored in the last mbuf chain of the transmission.

In summary, when a storage appliance receives data from a network, it allocates memory buffers to store the received data. The memory buffers used to store incoming data from a network can subsequently be used within the different layers of a storage operating system. Since data is often received from a network in packets of unequal sizes, the storage appliance's storage operating system may have to construct linked lists of memory buffers to store a received data packet. Typically, a plurality of data packets will be associated with a single data transmission, and the operating system can construct linked lists of memory buffer chains to store the overall data transmission.

E. Zero Copy Writes Using Block Protocols

As noted above, when a storage operating system receives a block of data as a series of packets having various lengths, the data is usually stored in a linked list of mbuf chains, each chain storing one of the data packets. Therefore, data received by a storage operating system typically must be converted from the variable length mbuf chains to fixed block sizes (i.e. its file system buffers) its file system can use. In conventional storage appliances, the variable length mbuf chains (via copy operations) are copied into appropriate fixed size blocks (buffers), thereby expending processing bandwidth. The present invention eliminates these copy operations of the data into fixed size file system buffers and instead utilizes the data as stored in the mbufs by passing appropriate pointers among the various layers of the storage operating system.

Figure 7:
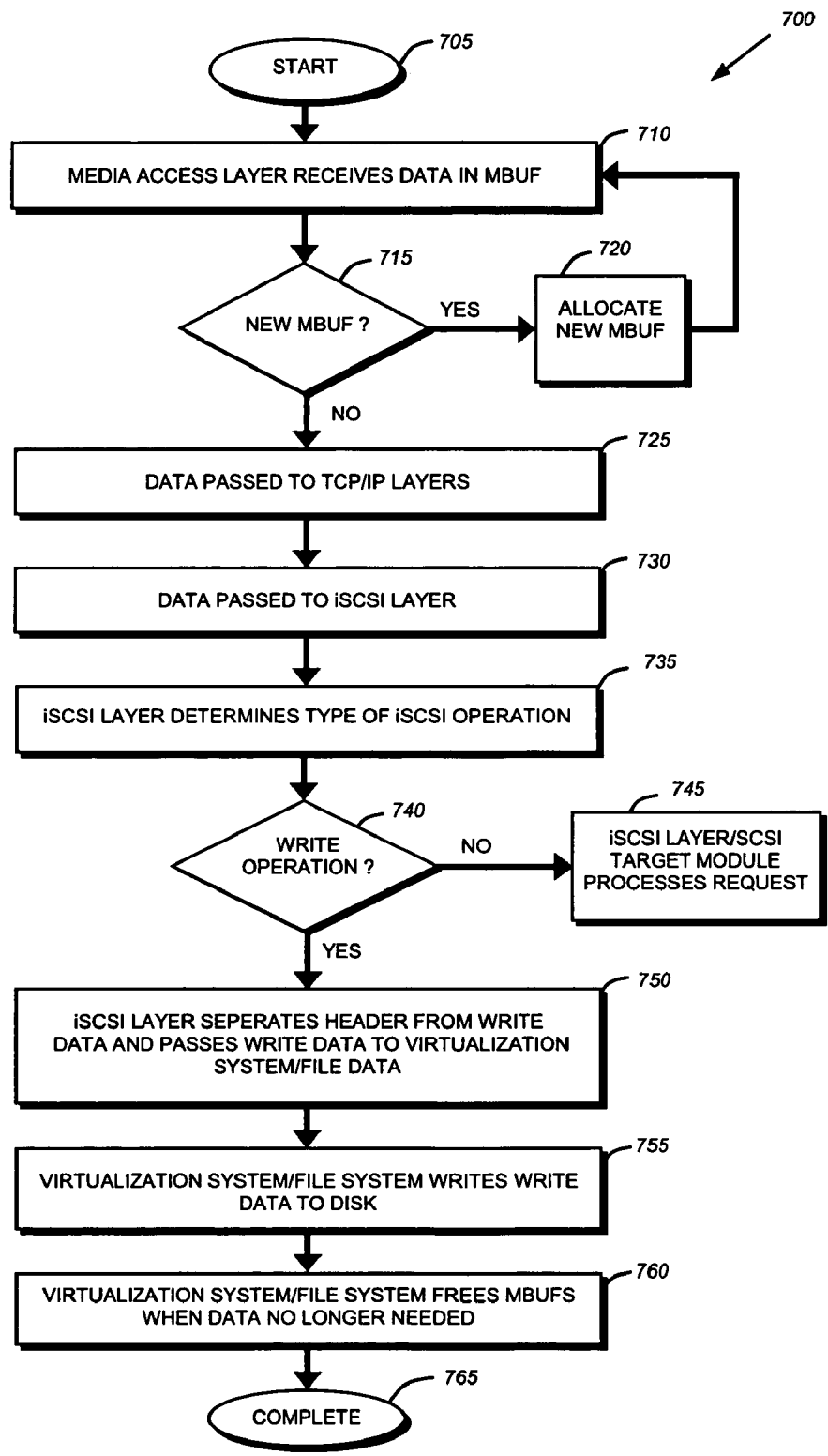
FIG. 7 is a flow chart detailing the steps of a procedure to perform zero copy block protocol rights in accordance with an embodiment of the present invention.

FIG. 7 is a flowchart detailing the steps of a procedure 700 for implementing zero copy block protocol based data access operations in accordance with an illustrative embodiment of the present invention. The procedure begins in step 705 and continues to step 710 where a media access layer of the storage operating system receives data stored in data packets. The data in the packets are received from a network and stored in appropriate mbufs allocated by the storage operating system. More than one mbuf may be required to receive data that spans a plurality of data packets. Thus, in step 715, the storage operating system decides whether received data can fit into an allocated mbuf or whether a new mbuf must be additionally allocated. If a new mbuf needs to be allocated, the procedure branches to step 720 where the new mbuf is allocated. Once the allocation of the mbuf is complete, the procedure loops back to step 710 to receive additional data.

However, if it is determined that a new mbuf is not required in step 715, the procedure continues to step 725 where the data in the mbufs is passed to the TCP/IP layers of the storage operating system. In the TCP/IP layers, the network header information is removed (stripped) from the received data and the resultant mbufs are forwarded to the iSCSI layer in step 730. In alternate implementations, the TCP/IP layers may perform additional functions such as data integrity checks and/or cryptographic functions as are conventionally known in the art.

In step 735, the iSCSI layer determines the type of iSCSI operation requested in the received mbufs. Then, in step 740, a determination is made whether the operation is write operation. If the operation is not a write operation, the procedure branches to step 745 and the iSCSI layer, in conjunction with the SCSI target module, processes the appropriate request. This may occur when, for example, the received operation is a read operation.

However, if the operation is a write operation, the procedure continues to step 750 where the iSCSI layer separates the header of a conventional iSCSI protocol data unit (PDU) from the write data and passes the write data to the SCSI target module of the virtualization system. This data is passed via, in the illustrative embodiment, a function call by the iSCSI layer to the SCSI target module within the storage operating system. Illustratively, this function call includes a pointer identifying a location where the data is stored for the write operation. Additionally, in accordance with the illustrative embodiment, this function call includes a flag that identifies whether the pointer references conventional file system buffers or whether the pointer references a linked list of mbufs in accordance with the present invention.

In step 755 the virtualization system writes the received write data to disk. In the illustrative embodiment, if the amount of data to be written exceeds 64 kilobytes (64 kb) the storage system will send a series of conventional iSCSI requests to transfer (R2T) packets so that the write data is transferred in 64 kb blocks in accordance with the well-known iSCSI protocol.

Once the appropriate data has been written to disk, the virtualization system frees the appropriate mbufs as they are no longer needed (step 760). Mbufs may be freed immediately after they are written to disk or, in alternate embodiments, may be retained in memory as a backing store to respond to read requests directed to the newly written data. The procedure is then complete in step 765.

To again summarize, the present invention is directed to a system and method for providing zero copy write operations when using block based protocols over conventional network protocols, such as iSCSI. A storage system, such as storage appliance 100, that implements the present invention handles data received in mbufs without copying the data into other memory data containers such as fixed size file system buffers as to thereby reduce processor consumption. In the illustrative embodiment, the iSCSI driver of the storage operating system receives mbufs from the TCP/IP layers. The mbufs contain conventional SCSI CDBs that are processed by the iSCSI driver, which then passes the appropriate mbuf pointers to the SCSI target module to interface with the file system. The mbuf pointers reference the same memory locations where the data was originally deposited by the TCP/IP layers. Thus, no copies of the received data are made during a write operation.

The foregoing has been a detailed description of an illustrative embodiment of the invention. Various modifications and additions can be made without departing from the spirit and scope of the invention. Additionally, while this description has been written in reference to storage appliances and file servers, the principles are equally pertinent to all types of computers, including those configured for block-based storage systems (such as storage area networks), file-based storage systems (such as network attached storage systems), combinations of both types of storage systems, and other forms of computer systems. Further, it is expressly contemplated that the teachings of this invention can be implemented as software, including a computer-readable medium having program instructions executing on a computer, hardware, firmware, or a combination thereof. Accordingly this description is meant to be taken only by way of example and not to otherwise limit the scope of the invention.

What is claimed is:

1. A method for performing operations utilizing a block based protocol, the method comprising the steps of:
    receiving a write operation from a client, the write operation including data,
    writing the data being written into a set of memory buffers;
    passing pointers that reference the set of memory buffers to a block protocol module, the block protocol module adapted to interpret a command contained within the data and to forward a subset of the memory buffers to a target module; and
    performing, by the target module, the command utilizing data stored within the subset of the memory buffers.

2. The method of claim 1 wherein the block based protocol comprises a small computer systems interface protocol encapsulated in transport control protocol/internet protocol.

3. The method of claim 1 wherein the command comprises a write operation and the subset of the data comprises data to be written in accordance with the write operation.

4. The method of claim 1 wherein the target module is associated with a virtualization system that utilizes the subset of the data in the set of memory buffers as a backing store.

5. The method of claim 1 further comprising the step of freeing the set of memory buffers after completing the operation.

6. The method of claim 1 wherein the step of forwarding the subset of memory buffers to the target module further comprises the step of forwarding a set of pointers to the appropriate subset of memory buffers.

7. A system for performing operations utilizing a block based protocol, the system comprising:
    means for receiving a write operation from a client, the write operation including data;
    means for writing the data into a set of memory buffers;
    means for passing the set of memory buffers to a block protocol module, the block protocol module adapted to interpret a command contained within the data and to forward a subset of the memory buffers to a target module; and
    means for performing the command utilizing data stored within the subset of the memory buffers.

8. The system of claim 7 wherein the block based protocol comprises a small computer systems interface protocol encapsulated in transport control protocol/internet protocol.

9. The system of claim 7 wherein the command comprises a write operation and the subset of the data comprises data to be written in accordance with the write operation.

10. The system of claim 7 wherein the target module is associated with a virtualization system that utilizes the subset of the data in the set of memory buffers as a backing store.

11. The system of claim 7 further comprising means for freeing the set of memory buffers after completing the operation.

12. A system for performing operations utilizing a block based protocol, the system comprising:
    a protocol module adapted to interpret a command contained within a set of memory buffers and further adapted to forward an appropriate subset of the memory buffers to a target module that is adapted to perform the command using data stored within a subset of the memory buffers, whereby no in-memory copy of the memory buffers is made.

13. The system of claim 12 further comprising a file system adapted to use the memory buffers as a backing store and further adapted to directly write data within the memory buffers to a storage device.

14. The system of claim 13 wherein the file system is further adapted to free the memory buffers after writing data within the memory buffers to a storage device.

15. The system of claim 12 wherein the target module comprises a small computer systems interface target module.

16. The system of claim 12 wherein the command comprises a write operation.

17. A computer readable medium containing executable program instructions for performing operations utilizing a block based protocol, the executable instructions comprising one or more program instructions for:
    receiving a write operation from a client, the write operation including data;
    writing the data into a set of memory buffers;

passing the pointers that reference the set of memory buffers to a block protocol module, the block protocol module adapted to interpret a command contained within the data and to forward a subset of the memory buffers to a target module; and performing, by the target module, the command utilizing data stored within the subset of the memory buffers.

18. A method for performing a zero copy write operation utilizing a block based protocol, the method comprising the steps of:

receiving the write operation including write data at a set of memory buffers;

separating header information from write data within the set of memory buffers;

passing a set of pointers associated with the write data to a virtualization system; and performing the write operation utilizing the write data within the memory buffers, whereby no in-memory copy is made of the memory buffers.

19. The method of claim 18 further comprising the step of freeing the memory buffers after completing the write operation.

20. The method of claim 18 further comprising the step of utilizing the memory buffers as a backing store for a file system to service read requests for the write data.

21. The method of claim 18 wherein the step of receiving the write operation including write data at a set of memory buffers further comprises the steps of:

receiving data from a network interface;

determining if an additional memory buffer is required to store the received data; and if so, creating an additional memory buffer to store the received data.

22. The method of claim 18 wherein the block based protocol comprises a Small Computer Systems Interface protocol encapsulated in a Transport Control Protocol/Internet Protocol.

* * * * *